(12) United States Patent
Ikeda et al.

(10) Patent No.: US 6,243,723 B1
(45) Date of Patent: Jun. 5, 2001

(54) DOCUMENT CLASSIFICATION APPARATUS

(75) Inventors: Takahiro Ikeda; Akitoshi Okumura; Takayoshi Ochiai, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/082,190

(22) Filed: May 21, 1998

(30) Foreign Application Priority Data

May 21, 1997 (JP) .................................................. 9-131071

(51) Int. Cl.[7] .................................................. G06F 15/00
(52) U.S. Cl. .................................................. 707/514; 707/3
(58) Field of Search ................... 707/1–7, 10, 100–104, 707/200, 500, 504, 508, 515, 526, 530; 345/55, 356

(56) References Cited

U.S. PATENT DOCUMENTS

| | | | | |
|---|---|---|---|---|
| 5,408,607 | * | 4/1995 | Nishikawa et al. | 709/218 |
| 5,761,666 | * | 6/1998 | Sakai et al. | 707/100 |
| 5,836,922 | * | 11/1998 | Shima et al. | 707/522 |
| 5,907,836 | * | 5/1999 | Sumita et al. | 707/2 |

FOREIGN PATENT DOCUMENTS

| | | |
|---|---|---|
| 6-282587 | 10/1994 | (JP) . |
| 8-153121 | 6/1996 | (JP) . |
| 8-263514 | 10/1996 | (JP) . |
| 8-320881 | 12/1996 | (JP) . |

\* cited by examiner

*Primary Examiner*—Joseph H. Field
*Assistant Examiner*—Alford W. Kindred
(74) *Attorney, Agent, or Firm*—Foley & Lardner

(57) ABSTRACT

The objective of the present invention is to provide a document classification apparatus, which utilizes extracted keywords from the bodies of documents to classify the documents. The document classification apparatus is mainly made up of the following apparatus:

A 5W1H keyword extraction apparatus that extracts keywords with 5W1H attributes in an entered document. The classification key setting apparatus that sets the 5W1H attributes entered by a user as classification keys. The classification item selection apparatus that selects keywords as classification items from the extracted keywords with the 5W1H attributes set as the classification keys. The document distribution apparatus that distributes a document including the previously selected classification items with the 5W1H attributes set as classification keys, into a cell corresponding to the classification items. Enabling documents to be classified from meaningful 5W1H viewpoints.

22 Claims, 12 Drawing Sheets

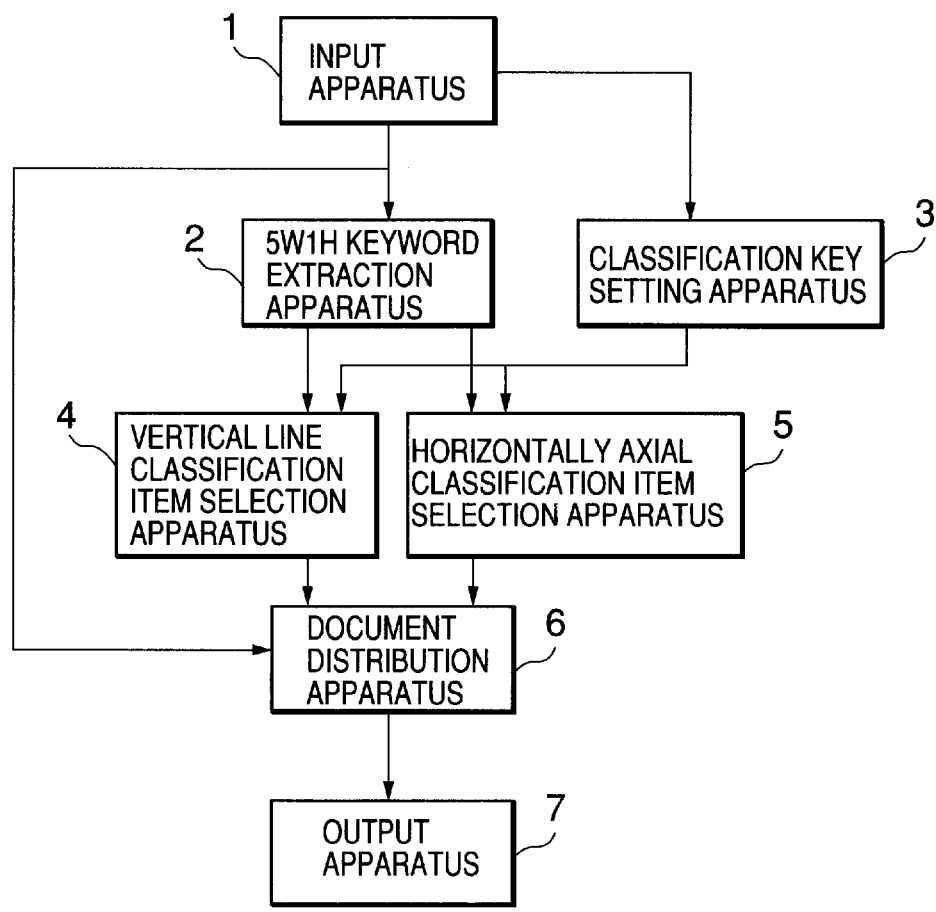

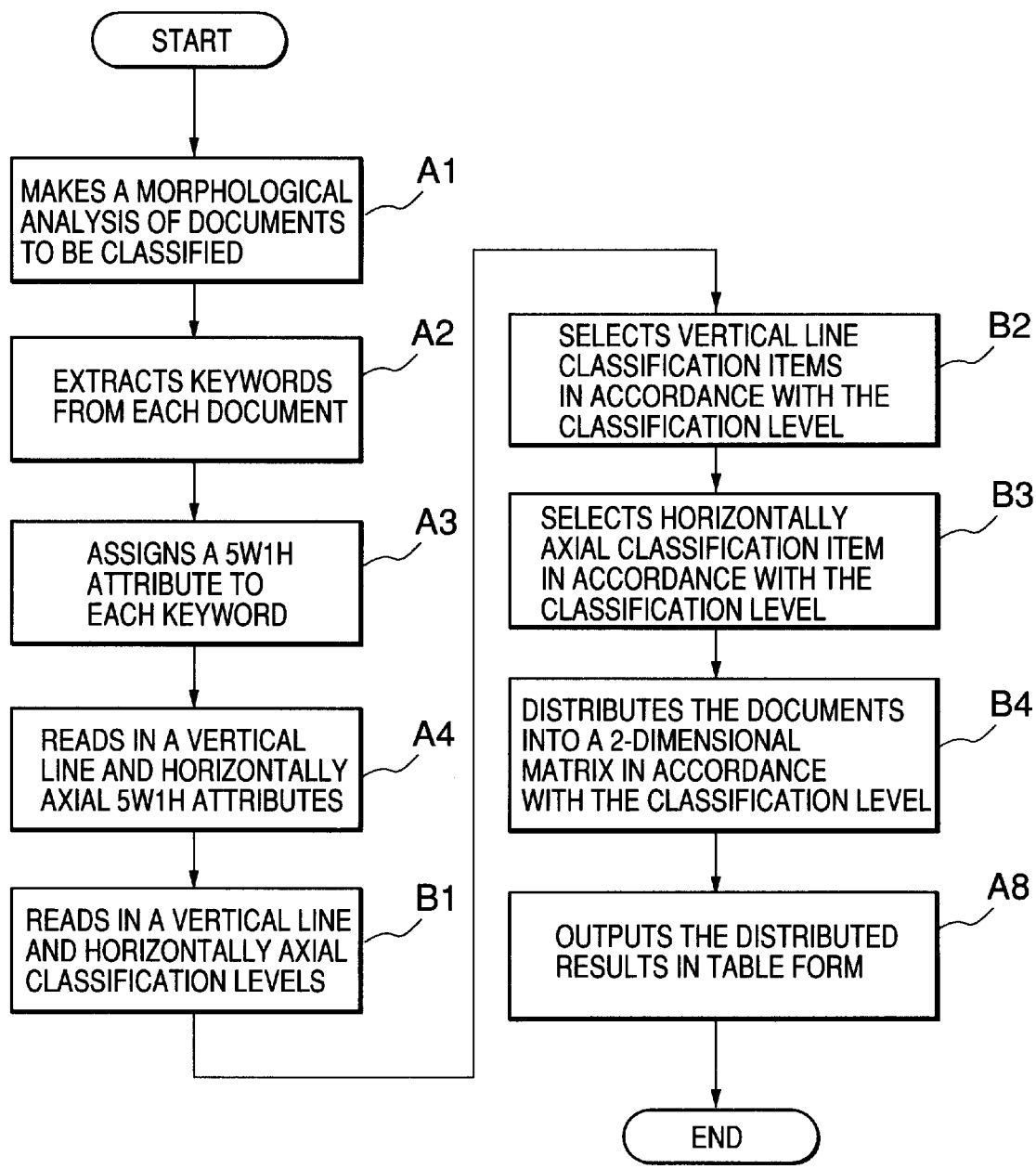

FIG. 6

1: A-SHA ha, shingata no PC wo HATSUBAI suru. A-SHA ha, kore to doji ni, shingata no PURINTA wo HATSUBAI suru. Mata, A-SHA ha, kore ni awasete, DISUPUREI wo NESAGE suru.

> #1: A corporation will put a new type of PC on sale. A corporation will also put a new type of printer on sale, simultaneously. Coinciding with this sale, A corporation will make a price reduction of a display.

2: B-SHA ha. sekai-sai-keiryo no PC wo KAIHATSU shita.

> #2: B corporation has developed the world lightest PC.

3: C-SHA ha, omoni keitai-gata no PC wo SEISAN shiteita. C-SHA ha, genzai, keitai-gata no PURINTA wo KAIHATSU shiteiru.

> #3: C corporation was mainly manufacturing a portable PC. C corporation is now developing a portable printer.

4: B-SHA ga kabekake-gata no DISUPUREI wo KAIHATSU shita. B-SHA ha, kore ni awasete, kabekake-gata no PC wo SHISAKU shiteiru.

> #4: B corporation has developed a wall display. Coinciding with the development, B corporation is also experimentally developing a wall PC.

5: D-SHA ha, taiyo-denchi de dosa suru PC wo HATSUBAI shita.

> #5: D corporation has put a solar battery driven PC on sale.

6: B-SHA ha. oritatami-siki no DISUPUREI wo KAIHATSU shita.

> #6: B corporation has developed a collapsible display.

7: A-SHA ga shiiru-sakusei-kino-tsuki no PURINTA wo HATSUBAI shita. A-SHA ha, shiiru-sakusei-sofuto-tosai no PC wo doji ni HATSUBAI suru.

> #7: A corporation has put a printer with a seal making function on sale. A corporation will put a PC mounted with a seal making software on sale, simultaneously.

8: B-SHA ha. atarashii hairetsu no KIIBODO wo HATSUBAI suru.

> #8: B corporation will put a new configuration keyboard on sale.

9: E-SHA ga, ryomen-doji-insatsu-taio no PURINTA wo HATSUBAI shita.

> #9: E corporation has put a duplex printing machine on sale.

10: C-SHA ga shin-dezain no MAUSU wo HATSUBAI suru.

> #10: C corporation will put a new model mouse on sale.

11: A-SHA ha. sho-chu-gakko ni oku no PC wo NONYU shiteiru.

> #11: A corporation has been delivering many PCs to elementary and junior high schools.

12: B-SHA ha, waiaresu-gata no KIIBODO wo KAIHATSU shita.

> #12: B corporation has developed a wireless keyboard.

13: B-SHA ha. kanzen-bosui no PC wo SHISAKU shita.

> #13: B corporation has experimentally developed a full water-proof PC.

14: A-SHA ha. MAUSU wo chusen de 1000 nin ni PUREZENTO shiteiru.

> #14: A corporation has given one thousand people Mouses by lot.

15: C-SHA ha, koremade, keitai-gata no PC wo HANBAI shiteita. C-SHA ha, aratani, keitai-gata no PURINTA wo HATSUBAI shita.

> #15: C corporation was putting portable PCs on sale to date. C corporation has put a newly portable printer on sale.

16: A-SHA ha. desukutoppu-gata no PC wo ZOUSAN suru.

> #16: A corporation will increase the production of a desk-top PC.

FIG. 7

| DOCUMENT NUMBER | KEYWORD WITH THE WHO ATTRIBUTE | KEYWORD WITH THE WHAT ATTRIBUTE | KEYWORD WITH THE HOW ATTRIBUTE |
|---|---|---|---|
| #1 | A-SHA (A corporation) | PC (PC) | HATSUBAI (SALE) |
| | A-SHA (A corporation) | PURINTA (PRINTER) | HATSUBAI (SALE) |
| | A-SHA (A corporation) | DISUPUREI (DISPLAY) | NESAGE (PRICE REDUCTION) |
| #2 | B-SHA (B corporation) | PC (PC) | KAIHATSU (DEVELOP) |
| #3 | C-SHA (C corporation) | PC (PC) | SEISAN (MANUFACTURE) |
| | C-SHA (C corporation) | PURINTA (PRINTER) | KAIHATSU (DEVELOP) |
| #4 | B-SHA (B corporation) | DISUPUREI (DISPLAY) | KAIHATSU (DEVELOP) |
| | B-SHA (B corporation) | PC (PC) | SHISAKU (EXPERIMENTALLY DEVELOP) |
| #5 | D-SHA (D corporation) | PC (PC) | HATSUBAI (SALE) |
| #6 | B-SHA (B corporation) | DISUPUREI (DISPLAY) | KAIHATSU (DEVELOP) |
| #7 | A-SHA (A corporation) | PURINTA (PRINTER) | HATSUBAI (SALE) |
| | A-SHA (A corporation) | PC (PC) | HATSUBAI (SALE) |
| #8 | B-SHA (B corporation) | KIIBODO (KEYBOARD) | HATSUBAI (SALE) |
| #9 | E-SHA (E corporation) | PURINTA (PRINTER) | HATSUBAI (SALE) |
| #10 | C-SHA (C corporation) | MAUSU (MOUSE) | HATSUBAI (SALE) |
| #11 | A-SHA (A corporation) | PC (PC) | NONYU (DELIVER) |
| #12 | B-SHA (B corporation) | KIIBODO (KEYBOARD) | KAIHATSU (DEVELOP) |
| #13 | B-SHA (B corporation) | PC (PC) | SHISAKU (EXPERIMENTALLY DEVELOP) |
| #14 | A-SHA (A corporation) | MAUSU (MOUSE) | PUREZENTO (PRESENT) |
| #15 | C-SHA (C corporation) | PC (PC) | HANBAI (SALE) |
| | C-SHA (C corporation) | PURINTA (PRINTER) | HATSUBAI (SALE) |
| #16 | A-SHA (A corporation) | PC (PC) | ZOUSAN (INCREASE THE PRODUCTION) |

FIG. 8

| WHO \ WHAT | PC | PRINTER | DISPLAY | OTHERS |
|---|---|---|---|---|
| A CORPORATION | #1, #7, #11, #16 | #1, #7 | #1 | #14 |
| B CORPORATION | #2, #4, #13 | | #4, #6 | #8, #12 |
| C CORPORATION | #3, #15 | #3, #15 | | #10 |
| OTHERS | #5 | #9 | | |

FIG. 9

| WHO \ WHAT | PC | KEYBOARD | MOUSE | OTHERS |
|---|---|---|---|---|
| A CORPORATION | #1, #7, #11, #16 | | #14 | |
| B CORPORATION | #2, #4, #13 | #8, #12 | | #6 |
| C CORPORATION | #3, #15 | | #10 | |
| OTHERS | #5 | | | #9 |

FIG. 10

1: SHIROISHI-SHI ni A-SHA ga noto-gata PC no KOJO wo KENSETSU shita.

1: A corporation has constructed a factory for a note-book PC in Shiroishi city.

2: B-SHA ha, GUNMA-KEN de PHS wo SEISAN shiteiru. Mata, B-SHA ha, SHIGA-KEN de TEREBI wo SEISAN shiteiru.

2: B xorporation is manufacturing a PHS in Gunma prefecture. B corporation is also manufacturing TVs in Shiga prefecture.

3: C-SHA ha, SENDAI-SHI ni atarashii KENKYUKYOTEN wo KAISETSU shita.

3: C corporation has developed an additional research foothold in Sendai city

4: D-SHA ha, KANTO-CHIHO de KEITAI-GATA-JOHOTANMATSU wo genteitekini HANBAI suru.

4: D corporation will put a portable information terminal on limitative sale in Kanto area.

5: B-SHA ha, FUKUOKA-SHI ni SHISHA wo SETCHI shita.

5: B corporation has established their branch in Fukuoka city.

6: YOKOHAMA-SHI de A-SHA ga TSUSHIN-SABISU wo KAISHI shita. A-SHA ha, sudeni KOBE-SHI de, doyo no TSUSHIN-SABISU wo TEIKYO shiteiru.

6: A corporation has started communication services in Yokohama city. A corporation has already started equivalent communication services in Kobe city.

7: C-SHA ha, HYOTO-KEN ni atarashii KOGAISHA wo SETCHI shita.

7: C corporation has established an additional child company in Hyogo prefecture.

8: A-SHA ha, KAWASAKI-SHI ni chijo-70-kai-date no HONSHA-BIRU wo KENSETSU suru.

8: A corporation will construct their head office building with seventy stories in Kawasaki city.

9: B-SHA ha, KANAGAWA-KEN de jikken-setsubi-yo no TOCHI wo SHUTOKU shita.

9: B corporation has acquired a land for facilities for experiments in Kanagawa prefecture.

10: A-SHA ha, AKASHI-SHI de, keburu-terebi-kaisen ni yoru VOD-shisutemu no JIKKEN wo KAISHI shita.

10: A corporation has started testing the VOD system with a cable TV communication in Akashi city.

FIG. 11

| DOCUMENT NUMBER | KEYWORD WITH THE WHO ATTRIBUTE | KEYWORD WITH THE WHERE ATTRIBUTE | KEYWORD WITH THE WHAT ATTRIBUTE | KEYWORD WITH THE HOW ATTRIBUTE |
|---|---|---|---|---|
| #1 | A-SHA (A corporation) | SHIROISHI-SHI (SHIROISHI CITY) | KOJO (FACTORY) | KENSETSU (CONSTRUCE) |
| #2 | B-SHA (B corporation) | GUNMA-KEN (GUMMA PREFECTURE) | PHS (PHS) | SEISAN (MANUFACTURE) |
| #2 | B-SHA (B corporation) | SHIGA-KEN (SHIGA PREFECTURE) | TEREBI (TELEVISION) | SEISAN (MANUFACTURE) |
| #3 | C-SHA (C corporation) | SENDAI-SHI (SENDAI CITY) | KENKYUKYOTEN (RESEARCH FOOTHOLD) | KAISETSU (DEVELOP) |
| #4 | D-SHA (D corporation) | KANTO-CHIHO (KANTO DISTRICT) | KEITAI-GATA-JOHOTANMATSU (INFORMATION TERMINAL) | HANBAI (SALE) |
| #5 | B-SHA (B corporation) | FUKUOKA-SHI (FUKUOKA CITY) | SHISHA (BRANCH) | SETCHI (ESTABLISH) |
| #6 | A-SHA (A corporation) | YOKOHAMA-SHI (YOKOHAMA CITY) | TSUSHIN-SABISU (COMMUNICATION SERVICE) | KAISHI (START) |
| #6 | A-SHA (A corporation) | KOBE-SHI (KOBE CITY) | TSUSHIN-SABISU (COMMUNICATION SERVICE) | TEIKYO (SERVICE) |
| #7 | C-SHA (C corporation) | HYOGO-KEN (HYOGO PREFECTURE) | KOGAISHA (CHILD COMPANY) | SETCHI (ESTABLISH) |
| #8 | A-SHA (A corporation) | KAWASAKI-SHI (KAWASAKI CITY) | HONSHA-BIRU (HEAD OFFICE BUILDING) | KENSETSU (CONSTRUCT) |
| #9 | B-SHA (B corporation) | KANAGAWA-KEN (KANAGAWA PREFECTURE) | TOCHI (LAND) | SHUTOKU (ACQUIRE) |
| #10 | A-SHA (A corporation) | AKASHI-SHI (AKASHI CITY) | JIKKEN (TEST) | KAISHI (START) |

FIG. 13

| DOCUMENT NUMBER | KEYWORD WITH A WHERE ATTRIBUTE | → | UPPER NOTION IN LEVEL 1 |
|---|---|---|---|
| #1 | SHIROISHI CITY | → | TOHOKU AREA |
| #2 | GUNMA PREFECTURE | → | KANTO AREA |
| | SHIGA PREFECTURE | → | KINKI AREA |
| #3 | SENDAI CITY | → | TOHOKU AREA |
| #4 | KANTO AREA | → | KANTO AREA |
| #5 | FUKUOKA CITY | → | KYUSHU AREA |
| #6 | YOKOHAMA CITY | → | KANTO AREA |
| | KOBE CITY | → | KINKI AREA |
| #7 | HYOGO PREFECTURE | → | KINKI AREA |
| #8 | KAWASAKI CITY | → | KANTO AREA |
| #9 | KANAGAWA PREFECTURE | → | KANTO AREA |
| #10 | AKASHI CITY | → | KINKI AREA |

FIG. 14

| WHO \ WHAT | A CORPORATION | B CORPORATION | C CORPORATION | OTHERS |
|---|---|---|---|---|
| KANTO AREA | #6, #8 | #2, #9 | | #4 |
| KINKI AREA | #6, #10 | #2 | #7 | |
| TOHOKU AREA | #1 | | #3 | |
| OTHERS | | #5 | | |

DOCUMENT CLASSIFICATION APPARATUS

BACKGROUND OF THE INVENTION

1. Field of the Invention

The present invention relates to a document classification apparatus, which classifies large documents into categories, each of which includes documents with similar contents, and more particularly relates to a document classification apparatus which utilizes extracted keywords from the bodies of documents to automatically classify the documents.

2. Description of the Related Art

For the user in information support services, and in cases where the information in support services is abundant, there is a need for the information to be classified and arranged so the user can select only the related information. For example, there are several types of information support services available to provide information necessary for users in a variety of documents opened through the Internet accessed by personal computers. There are also a variety of documents available such as those owned by groups and those held by individuals. A first type of information support service is where the conditions of the necessary information for a user are entered, and then documents in conformity with the conditions will be retrieved. A second type of information support service is that updated information corresponding to the conditions set by a user in advance is distributed. In cases where the volume of retrieved and/or distributed documents is large, the user will experience difficulty in reading all of the information. However, if the retrieved and/or distributed documents could be classified in advance then presented to the user, the user can select and read only the necessary information.

There is in existence a classification system where a plurality of documents are classified into a plurality of categories. In the system, each document is represented by classification keywords, which may be assigned or extracted by human hands. Correspondence and resemblance of classification keywords between documents enable classification. For example, in "Document information classification method and apparatus" described in the Japanese Patent Application Laid-open No. Hei-8-153121 (hereinafter, referred to as "preceding reference 1"), a document is divided through, for example, a morphological analysis, and then keywords are extracted. Classification is made so that documents with the same keywords can be classified into the same category. Furthermore, resemblance of categories are determined with the resemblance of documents included in the categories. Then several categories are combined; thus, forming a final classification system.

In the "Automatic document classification method and apparatus, and classification dictionary generation method and apparatus" described in Japanese Patent Application Laid-open No. Hei-6-282587 (hereinafter, referred to as "preceding reference 2"), when keywords are extracted, parts of speech such as a subject and an object for the respective keywords are also extracted. Thus, even though a keyword is equivalent to another keyword, it will be determined to be different from the latter due to their different parts of speech. In this reference, documents including the same pair of keywords that frequently appear are put into the same category; thus, a one-dimensional classification is performed.

In the "Automatic document classification method, information space visualizing method, and information retrieval system" described in Japanese Patent Application Laid-open No. Hei-8-263514 (hereinafter, referred to as "preceding reference 3"), keywords are extracted from each document; the occurrence frequencies of the keywords are represented with a row of weights; and each document is represented with a vector composed of the row of the weights. With vectors, documents will be classified so that documents with similar vectors are placed close to each other in a 2-dimensional matrix. Two axes in the matrix have no specific meaning, yet are defined equally.

In the "Document retrieval system" described in Japanese Patent Application Laid-open No. Hei-8-320881 (hereinafter, referred to as "preceding reference 4"), keywords that a user has prepared are utilized as classification keys, wherein documents will be classified in a 2-dimensional matrix. In other words; a document including both vertical line classification keys that correspond to the row and horizontally axial classification keys that correspond to the column in the matrix, is classified into a cell in the matrix.

A first problem on the conventional document classification apparatus is that their classification axes are meaningless to the objects which will be classified. In the "Document information classification method and apparatus" described in the preceding reference 1 and "Automatic document classification method and apparatus, and classification dictionary generation method and apparatus" described in the preceding reference 2, to construct a system with a bottom-up approach, similar documents are combined. This system is not always a good classification system along with the meaningful classification axes, from the top-down viewpoint. In "Automatic document classification method, the information space visualizing method, and the information retrieval system" described in the preceding reference 3, documents are classified into a 2-dimensional matrix where the vertical line and horizontal axis have no specific meaning. Therefore, a user has difficulty in making use of the classification results. Furthermore, in "Document retrieval system" described in the preceding reference 4, classification is performed with user selected keywords, however, the user has difficulty in selecting preferable keywords to the objects to be classified. If selection of the keywords is not appropriately made, a plurality of documents will possibly be intensively classified into the same category.

A second problem of the conventional document classification apparatus is that no combination of a plurality of classification axes can be made in accordance with objects to be classified. In "Document information classification method and apparatus" described in the preceding reference 1 and "Automatic document classification method and apparatus, and classification dictionary generation method and apparatus" described in the preceding reference 2, classification is made with a tree-structural system. However, it cannot be made with the combination of several classification viewpoints. In "Automatic document classification method, information space visualizing method, and information retrieval system" described in the preceding reference 3, classification axes have no specific meaning, and no combination of several axes can exist. No combination of several classification axes to objects are allowed, causing difficulty in the comparison of document distribution from several viewpoints to that from other viewpoints when the classified structure from the former viewpoints differs from that of the latter viewpoints. When classification is performed into a 2-dimensional matrix using user selected keywords, in a way shown in the "Document retrieval system" described in the preceding reference 4, classification from several viewpoints will be allowed. However, not all users are able to prepare horizontally axial keywords to appropriately correspond to the vertical line keywords. This may lead to a situation where few documents with both vertical line keywords and horizontally axial keywords exist. Therefore, classification suitable for objects is not necessarily made.

SUMMARY OF THE INVENTION

A first document classification apparatus according to the present invention extracts keywords with 5W1H attributes from an entered document; selects keywords with the 5W1H attribute designated as a vertical line classification item and a horizontally axial classification item; and then classifies the document into a 2-dimensional matrix, in accordance with the selected classification items. More specifically, the document classification apparatus comprises: a 5W1H keyword extraction apparatus (2 in FIG. 1) to extract keywords with 5W1H attributes from a document entered through an input apparatus; a classification key setting apparatus (3 in FIG. 1) to set two 5W1H attributes entered through the input apparatus as a vertical line classification key and a horizontally axial classification key, respectively; a vertical line classification item selection apparatus (4 in FIG. 1) to select vertical line classification items from the extracted keywords; a horizontally axial classification item selection apparatus (5 in FIG. 1) to select horizontally axial classification items from extracted keywords; and a document distribution apparatus (6 in FIG. 1) to distribute the document into a cell in a 2-dimensional matrix, in accordance with the selected classification items.

The document distribution apparatus distributes a document that includes a keyword selected as the vertical line classification item with the 5W1H attribute set as the vertical line classification key and further including a keyword selected as the horizontally axial classification item with the 5W1H attribute set as the horizontally axial classification key, into a cell located on the intersection of both the row corresponding to the vertical line classification items and the column corresponding to the horizontally axial classification items in the 2-dimensional matrix.

A second document classification apparatus according to the present invention classifies a document through utilizing upper notion category words as classification items in a designated level to the keywords, however, it does not utilizes the keywords themselves extracted from the document. More specifically, the document classification apparatus comprises: a classification level setting apparatus (8 in FIG. 4) to set two levels entered through an input apparatus as a vertical line classification level and a horizontally axial classification level, respectively; and a concept data base to store words, which may appear in the document, in hierarchic layers having different levels. The words are classified into corresponding hierarchic layers, respectively, in accordance with the upper or lower notion level to each of the words, when they are stored in the concept data base.

In the second document classification apparatus, a vertical line classification item selection apparatus and a horizontally axial classification item selection apparatus select upper notion category words as classification items to the keywords which are extracted from the words in the classification level in the concept data base, set by the classification level setting apparatus, and which are with the 5W1H attributes set as classification keys. The document distribution apparatus then distributes a document including both a first keyword with the 5W1H attribute set as a vertical line classification key and a second keyword with the 5W1H attribute set as a horizontally axial classification key, into a cell located on the intersection of both the row corresponding to the vertical line classification items and the column corresponding to the horizontally axial classification items in a 2-dimensional matrix; wherein the first keyword corresponds to a word in the vertical line level under the upper notion category, selected as the vertical line classification item, and the second keyword corresponds to a word in the horizontally axial level under the upper notion category, selected as the horizontally axial classification item.

BRIEF DESCRIPTION OF DRAWINGS

Other features and advantages of the invention will be made more apparent by the detailed description hereunder, taken in conjunction with the accompanying drawings, wherein:

FIG. 1 shows the configuration of a first embodiment according to the present invention;

FIG. 2 shows an example of 2-dimensional matrix used by a document classification apparatus 6 according to the present invention;

FIG. 5 is a flowchart showing the operation of the second embodiment according to the present invention;

FIG. 6 is the list of alphabetical Japanese documents entered in the first embodiment according to the present invention;

FIG. 7 is a table showing keywords with 5W1H attributes extracted from each document by a 5W1H keyword extraction apparatus 2 of the first embodiment according to the present invention;

FIG. 8 show output results in the first embodiment according to the present invention;

FIG. 9 shows output results in the modification of the first embodiment according to the present invention;

FIG. 10 shows the list of alphabetical Japanese documents entered in the second embodiment according to the present invention;

FIG. 11 shows a table of the keywords with 5W1H attributes extracted from each document by the 5W1H keyword extraction apparatus 2 of the second embodiment according to the present invention;

FIG. 13 is a table showing correspondence of the keywords with the WHERE attribute, extracted from each document by the 5W1H keyword extraction apparatus 2, to their upper notion category words in level 1 in a concept data base 9, in the second embodiment of the present invention;

FIG. 14 shows the output results in the second embodiment of the present invention.

DETAILED DESCRIPTION OF THE PREFERRED EMBODIMENT

Figure 3:
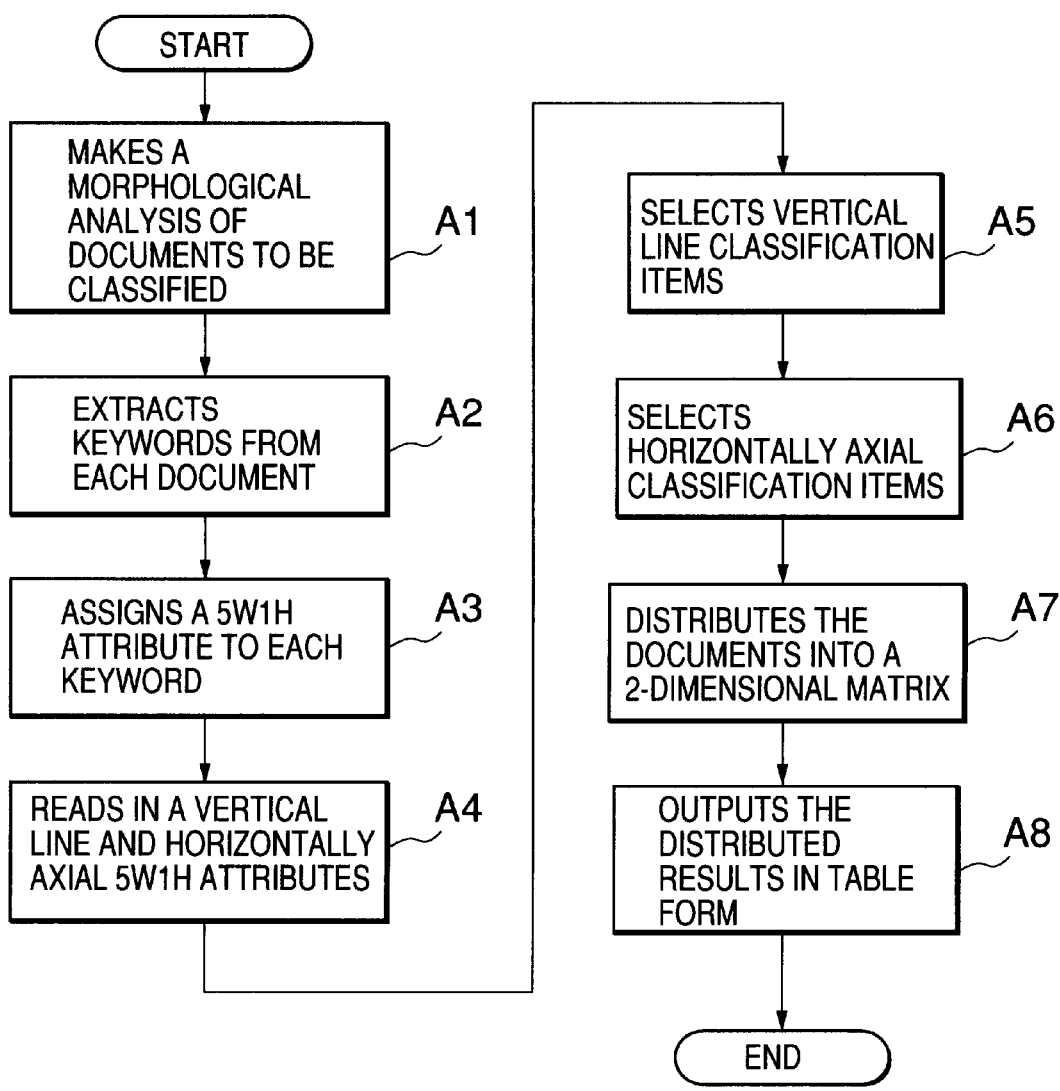
FIG. 3 is a flowchart showing the operation of the first embodiment.

A first embodiment of the present invention will be described in detail with reference to Figs.

Referring to FIG. 1, the first embodiment of the present invention is comprised of an input apparatus 1, a 5W1H keyword extraction apparatus 2, a classification key setting apparatus 3, a vertical line classification item selection apparatus 4, a horizontally axial classification item selection apparatus 5, a document distribution apparatus 6, and an output apparatus 7.

A group of documents, which will be classified, are input through the input apparatus 1.

The 5W1H keyword extraction apparatus 2 extracts keywords with 5W1H attributes from each document entered through the input apparatus 1. The 5W1H attributes indicates WHO(subject), WHEN(time), WHERE(location), WHAT(object), WHY(reason), HOW(working), respectively, showing the role of each keyword in the documents. For example, when three keywords 'A corporation', 'goods X', and 'Sell' are extracted from the sentence 'A corporation has sold goods X', the 5W1H attribute for 'A corporation' is WHO; for 'goods X', WHAT; for 'sell', HOW. The extracted keywords with 5W1H attributes are sent to both the vertical line classification item selection apparatus 4, and the horizontally axial classification item selection apparatus 5.

The classification key setting apparatus 3 allows a user to select 5W1H attributes for both the vertical line and the horizontal axis for classification. When inputting the user's selection, the classification key setting apparatus 3 sends the selected 5W1H attributes for the vertical line and horizontal axis to both the vertical line classification item selection apparatus 4 and the horizontally axial classification item selection apparatus 5, respectively.

The vertical line classification item selection apparatus 4 selects keywords for the vertical line classification items from the extracted keywords with 5W1H attributes; which was carried out by the 5W1H keyword extraction apparatus 2, in accordance with the 5W1H attributes for the vertical line set by the classification key setting apparatus 3.

The horizontally axial classification item selection apparatus 5 selects keywords for the horizontally axial classification items from the extracted keywords with 5W1H attributes; which was carried out by the 5W1H keyword extraction apparatus 2, in accordance with the horizontally axial 5W1H attribute set by the classification key setting apparatus 3.

The document distribution apparatus 6 distributes each document in an item unit, in accordance with the keywords selected by vertical line classification item selection apparatus and horizontally axial classification item selection apparatus 5. Each document is distributed into a cell in the 2-dimensional matrix, and then its results will be output through the output apparatus 7. Each row of the 2-dimensional matrix corresponds to the keywords selected by the vertical line classification item selection apparatus 4. Each column of the matrix corresponds to the keywords selected by the vertical line classification item selection apparatus 5. A document including keywords with both the selected; vertical line 5W1H attribute and the horizontally axial 5W1H attribute, is then distributed to a corresponding cell in the matrix. The matrix has an additional row for all the keywords unselected by the vertical line classification item selection apparatus 4. A document including no keyword with the selected vertical line 5W1H attribute in the other rows, will be classified into a cell in the additional row. Hereafter, we shall refer to the additional row as 'default row'. In addition, the matrix also has an additional column for all keywords unselected by the horizontally axial classification item selection apparatus 5. A document including no keyword with the selected horizontally axial 5W1H attribute in the other columns, will be classified into a cell in the additional column. Hereafter, we shall refer to the additional column as 'default column'. The presence of the default row and column leaves no documents which are not allowed to go into cells in the matrix. Otherwise, another structure without a default row and a default column can also be made. However, some documents may not be delivered into the matrix.

FIG. 2 shows an example of the 2-dimensional matrix in which the document distribution apparatus 6 will distribute. This is an example of when the classification key setting apparatus 3 selects both WHO for a vertical line 5W1H attribute and WHAT for a horizontally axial 5W1H attribute. The vertical line classification item selection apparatus 4 selects the keywords 'A corporation', 'B corporation', and 'C university', while the horizontal line classification item selection apparatus 5 selects other keywords 'goods X', 'goods Y', and 'apparatus Z'. Titles of items corresponding to the default row and column are referred as 'others'. In this example, a document including the keywords 'A corporation' with 5W1H attribute of WHO and 'goods Y' with 5W1H attribute of WHAT, is distributed into a cell 12. Otherwise, a document that includes the keyword 'C university' with 5W1H attribute of WHO and further including neither the keywords 'goods X', nor 'goods Y', and 'apparatus Z', is distributed to a cell 34.

The output apparatus 7, such as a display apparatus and a printer, outputs the document classification results.

Next, the operation of the first embodiment according to the present invention will be described with reference to FIG. 1 to FIG. 3.

The 5W1H keyword extraction apparatus 2 reads in a document to be sorted, via the input apparatus 1, and then a morphological analysis of each sentence in the document is made to divide each sentence into words, to determine the part of speech for each word (step A1). Next, keywords are extracted from each sentence (step A2). The extraction of the keywords can be made by extracting no more than specific parts of speech from each sentence, such as a noun and a verb. Next, 5W1H attributes are assigned to the extracted keywords, respectively (step A3). The 5W1H attributes assigned to the extracted keywords can be identified from a sentence of subsequent words, just after the keyword in a sentence, the characters in the keyword, and a part of speech for the keyword itself. For example, in the case of the Japanese language; there is a regulation where a keyword that is of a noun followed by the particle 'ga', will be identified as a subject. Thus, the noun's 5W1H attribute can be identified as WHO. In the same manner, the 5W1H attributes of the keywords including a suffix such as "gatsu" (="month") or "nichi" (="day"), followed by the particle "ni" meaning time can be identified as WHEN, and the 5W1H attributes of the keywords including a suffix such as "ken" (="prefecture") or "shi" (="city"), followed by the particle "ni" or "de" meaning location can be identified as WHERE. Furthermore, for the Japanese language, there is another regulation that identifying the keyword as an object when a keyword is of a noun followed by the particle "wo", and the noun's 5W1H attribute will be identified as WHAT. Furthermore, the 5W1H attribute for a keyword followed by a reason phrase "no tame" will be identified as WHY, and the 5W1H attribute for the keyword whose part of speech is a verb will be identified as HOW. Alternatively, beforehand-collection of words such as organization names, place names and the collation of related keywords enables the ability to identify an organization name's 5W1H attribute as WHO; a place name's 5W1H attribute as WHERE. Furthermore, other attributes of the sentences in documents such as a document publishing date can also be utilized as a keyword for the WHEN attribute.

Note that the present invention also can be applied to English documents to be classified; thus, the use of a conventional syntactic analysis of English sentences enables the extraction of keywords with the attributes WHO, WHAT, WHERE, WHEN, WHY, HOW from documents which will be classified.

Next, the classification key setting apparatus 3 reads in the 5W1H attributes, which will be utilized for the vertical line and the horizontal axis for classification. These are designated by a user via the input apparatus 1 (step A4).

The vertical line classification item selection apparatus 4 selects classification items for the vertical axis from the keywords with 5W1H attributes extracted by the 5W1H keyword extraction apparatus 2 in the steps A1 to A3. This is done in accordance with the vertical line 5W1H attributes set by the classification key setting apparatus 3 in the step A4 (step A5). This process is performed by selecting those with the 5W1H attributes selected for the vertical axis, in the order of the decreasing occurrence frequencies, from the extracted keywords with 5W1H attributes. While the number of items to be selected can be predetermined, it is also allowed that the selection process continues until the ratio of the number of documents, including the keywords with 5W1H attributes selected as the classification items to the total number of documents exceeds a given number.

In the step A5 wherein selection of classification items is made, simple selection of the keywords in the order of decreasing their occurrence frequencies in the whole of the documents can be made. Alternatively, by taking away the documents including the selected keywords with vertical line 5W1H attributes, selection of the items in the rest of the documents can also be made in the order of their decreasing occurrence frequencies. In this case, the number of documents including the selected keywords increases. Accordingly, the number of documents which will be distributed to cells in the default row becomes lower.

The horizontally axial classification item selection apparatus 5 selects horizontally axial classification items from the keywords with 5W1H attributes extracted by the 5W1H keyword extraction apparatus 2 in the steps A1 to A3, in accordance with the horizontally axial 5W1H attributes set by the classification key setting apparatus 3 in the step A4 (step A6). Hereafter, we shall refer to the documents including vertical line keywords with vertical line 5W1H attributes selected in the step A5, as 'vertical line keyword corresponding documents'. The operation in the step A6 is performed by selecting keywords that appear in the 'vertical line keyword corresponding documents', and out of the extracted vertical line keywords with horizontally axial 5W1H attributes, in the order of decreasing their occurrence frequencies.

In the step A6 wherein selection of classification items is performed, keywords are selected from the entire 'vertical line keyword corresponding documents' in the order of their decreasing occurrence frequencies; alternatively with documents including the selected keywords with the horizontally axial 5W1H attributes, being taken away, keywords can be selected from the rest of the documents in the order of decreasing their occurrence frequencies. In this case, the number of documents including the selected keywords increases, and the number of documents delivered into cells in the default row decreases.

The document distribution apparatus 6 distributes each document including the vertical line keyword (selected in the step A6) with the selected vertical line 5W1H attribute, and the horizontally axial keyword (selected in the step A6) with the selected horizontally axial 5W1H attribute, into a cell located on the intersection of both the row corresponding to the vertical line keywords and the column corresponding to the horizontally axial keyword (step A7). Each document that includes the vertical line keyword (selected in the step A5) with the selected vertical line 5W1H attribute, and further including no horizontally axial keyword (selected in the step A6) with the selected horizontally axial 5W1H attribute, will be delivered to a cell located on the intersection of both the row corresponding to the vertical line keywords and the default column in the 2-dimensional matrix. In addition, each document that includes no vertical line keyword (selected in the step A5) with the selected vertical line 5W1H attribute, and further including the horizontally axial keyword (selected in the step A6) with the selected horizontally axial 5W1H attribute, will be delivered into a cell located on the intersection of both the default row and the column corresponding to the horizontally axial keywords in the 2-dimensional matrix.

After the distribution of the documents has been completed in the step A7, the document distribution apparatus 6 outputs a table of the 2-dimensional matrix which the documents have been delivered into its respective cells, via the output apparatus 7 (step 8). The output table has several formats: A basic format in which each document itself is put into a cell in the 2-dimensional matrix and then output; A first format in which no more than each title of documents is put into a cell in the 2-dimensional matrix and then output, the title being linked to the body of the document; A second format in which the number of documents classified to a cell in the 2-dimensional matrix is put into its cell and then output, each cell having links to its corresponding document title in a title's list, and a link from each document title to corresponding document body being made. If the table has no default row or default column, undistributed documents into a cell in the matrix may exist. In this case, these documents should not be output. They should be combined and then output.

Next, the operation of the embodiment according to the present invention will be described in detail.

We shall assume that the document classification apparatus according to the present invention classifies sixteen documents #1 to #16 shown in FIG. 6. Herein, the Japanese reading of the sentences subsequent to each document number are written in the English alphabet. Just after each Japanese sentence, its English translation is placed. The 5W1H keyword extraction apparatus 2 extracts keywords from each sentence through a morphological analysis of the sentences in each document, and then assigns a 5W1H attribute to each keyword (steps A1 to A3). When we assume that a 5W1H attribute is assigned to each keyword in accordance with the following rules, keywords with 5W1H attributes in each document will be shown in FIG. 7.

(1) the 5W1H attribute of a keyword followed by the particle "ga" or "ha" is WHO (In Japanese, when either the previously mentioned "ga" or "ha" follows a noun, the noun is the subject in its sentence);

(2) the 5W1H attribute of a keyword including: both one of "nen" (="year"), "gatsu" (="month"), and "nichi" (="day"); and a number, is WHEN (In Japanese, the combination of a number and one of the previously mentioned "nen", "gatsu", and "nichi" specifies a year, month, and day);

(3) the 5W1H attribute of a country name and a prefecture name is WHERE. In addition, the 5W1H attribute of a keyword including either "shi" (="city") or "machi" (="town"), followed by the particle "ni" or "de" is WHERE (In Japanese, the combination of a noun representing a location and the previously mentioned "ni" or "de", specifies its location).

(4) the 5W1H attribute of a keyword followed by the particle "wo" is WHAT (In Japanese, a noun followed by "wo" is the object of the sentence).

(5) the 5W1H attribute of a keyword followed by both the particle "no" and the noun "tame" in series, is WHY (In Japanese, "no tame" represents a reason).

(6) the 5W1H attribute of a keyword, which appears at the end of each sentence and which is of a verb or a saline's irregular conjugation noun (which functions as a verb when "suru", "shita", "shiteiru", or "shiteita" follows) is HOW.

Note that in this example no keywords with the WHEN, WHERE, or WHY attribute are extracted; accordingly, these are omitted in FIG. 7.

Furthermore, note that in this example we assume that the entered documents are written in Japanese. However, the present invention can also be applied to English documents. For English documents, the use of a well-known syntactic analysis of English sentences enables the extraction of keywords with the 5W1H attributes.

The classification key setting apparatus 3 reads in the 5W1H attributes designated by a user for classification based on the vertical line and the horizontal axis (step A4). Here, we assume that WHO is designated as a vertical line 5W1H attribute, and WHAT as a horizontally axial 5W1H attribute.

The vertical line classification item selection apparatus 4 selects keywords with the WHO attribute from the extracted keywords with the 5W1H attributes in the order of their decreasing occurrence frequencies (step A5). Now, we assume that three classification items are selected in the order of their decreasing occurrence frequencies in the entirety of the documents. With reference to FIG. 7, the occurrence frequencies of keywords with the WHO attribute are eight for "A-SHA" (='A corporation'), seven for "B-SHA" (='B corporation'), five for "C-SHA" (='corporation'), one for "D-SHA" (='D corporation'), and one for "E-SHA" (='E corporation'); thus, the three keywords "A-SHA" (='A corporation'), "B-SHA" (='B corporation'), and "C-SHA" (='C corporation') will be selected as vertical line classification items in the previously written order.

Referring to FIG. 7, fourteen documents except for documents #5 and #9 include one of the "A-SHA" (='A corporation'), "B-SHA" (='B corporation'), and "C=SHA" (='C corporation') as keywords with the WHO attribute. The horizontally axial classification item selection apparatus 5 selects keywords with the WHAT attribute in the fourteen documents from the extracted keywords with 5W1H attributes in the order of their decreasing occurrence frequencies (step A6). Now, we assume that three classification items are selected in the previously mentioned fourteen documents, in the order of their decreasing occurrence frequencies (step A6). Referring to FIG. 7, the occurrence frequencies of the keywords with the WHAT attribute in the fourteen documents are nine for "PC", four for "PURINTA" (="PRINTER"), three for "DISUPUREI" (="DISPLAY"), two for "KIIBODO" (="KEYBOARD"), and two for "MAUSU" (="MOUSE"). Thus, three keywords "PC", "PURINTA" (="PRINTER"), and "DISUPUREI" (="DISPLAY") are selected as classification items in the previously written order.

The document distribution apparatus 6 distributes each document including both the vertical line keyword with the WHO attribute and the horizontally axial keyword with the WHAT attribute, into a cell located on the intersection of both the row corresponding to the vertical line keywords and the column corresponding to the horizontally axial keywords in the 2-dimensional matrix (step A7). A document including no vertical line keyword with the WHO attribute is distributed into a cell in the default row, while a document including no horizontally axial keyword with the WHAT attribute is distributed into a cell in the default column. For example, document #2 includes "A-SHA" (='A corporation') as a keyword with the WHO attribute, and "PC" as a keyword with the WHAT attribute; thus, it is distributed into a cell located on the intersection of both the row corresponding to "B-SHA" (='B corporation') and the column corresponding to "PC". To further exemplify, document #10 includes "C-SHA" (='C corporation') as a keyword with the WHO attribute, but does not include "PC", "PURINTA" (="PRINTER"), and "DISUPUREI" (="DISPLAY") as a keyword with the WHAT attribute; thus, it is distributed to a cell located on the intersection of both the row corresponding to "C-SHA" (='C corporation') and the default column.

After all documents have been distributed, the document distribution apparatus 6 outputs its results in a table format (step A8). When the output is performed in such a way that the document numbers are put into corresponding cells in the 2-dimensional matrix, the results are shown in FIG. 8.

Note that when both the vertical line classification item selection apparatus 4 and the horizontally axial classification item selection apparatus 5 select classification items in the order of their decreasing occurrence frequencies, elimination of the documents is made including the selected keywords with corresponding axial 5W1H attributes. Therefore, they can select keywords in the order of the decreasing occurrence frequencies in the rest of documents, as well as in the order of the decreasing the occurrence frequencies in the whole of the documents.

In the following, an operation in variation will be described: An operation in which the vertical line classification items are selected in the same manner as that of the previous example in the embodiment. However, when the horizontally axial classification item selection apparatus 5 selects horizontally axial classification items, documents including the selected keyword with the WHAT attribute are eliminated. Keywords of the WHAT attribute with high occurrence frequencies are selected.

In this case, in step A6, the horizontally axial classification item selection apparatus 5 selects a keyword with the WHAT attribute as a first horizontally axial classification item, that most frequently appears in the fourteen documents except for the documents #5 and #9. Referring to FIG. 7, the occurrence frequencies of keywords with the WHAT attribute in the fourteen documents are nine for "PC", four for "PURINTA" (="PRINTER"), three for "DISUPUREI" (="DISPLAY"), two for "KIIBODO" (="KEYBOARD"), and two for "MAUSU" (="MOUSE"). Thus, "PC" will be selected as the first horizontal axial classification item. Referring to FIG. 7, the five documents: #6, #8, #10, #12, and #14 of the fourteen documents include no "PC". Therefore, a keyword with WHAT attribute, that appears most frequently in the previously mentioned five documents, will be selected as a second horizontally axial classification item. Referring to FIG. 7, the occurrence frequencies of the keywords with the WHAT attribute in the five documents are two for "KIIBODO" (="KEYBOARD"), two for "MAUSU" (="MOUSE"), and one for "DISUPUREI" (="DISPLAY"). In this case, either "KIIBODO" (="KEYBOARD") or "MAUSU" (="MOUSE") will be selected. Here, it is assumed that "KIIBODO" (="KEYBOARD") is selected. Referring to FIG. 7, the three documents #6, #10, #14 of the previously mentioned five documents, include no "KIIBODO" (="KEYBOARD"). Therefore, a keyword with the WHAT attribute, which appears most frequently in the previously mentioned three documents, will be selected as a third horizontally axial classification item. Referring to FIG. 7, the occurrence frequencies of keywords with the WHAT attribute in the previously mentioned three documents are: two for "MAUSE" (="MOUSE"), and one for "DISUPUREI" (="DISPLAY"). Thus, "MAUSE" (="MOUSE") will be selected as the third horizontally axial classification item.

In steps A7 and A8, the document distribution apparatus 6 performs an identical process to that of the previous example. The output results in this case are shown in FIG. 9. In comparison with FIG. 8 showing the results in the previous example, the number of documents classified into the default row decreases, due to the fact that the method of selecting the horizontally axial classification items is changed.

Next, the advantages of the first embodiment according to the present invention will now be described.

In the first embodiment according to the present invention, keywords with 5W1H attributes are selected, and then a specific 5W1H attribute is selected for an axis which will be used to classify documents. Thus, document classification results from a meaningful viewpoint will be shown to the user. In addition, two classification axes are selected in the embodiment, and documents will be sorted with them into a 2-dimensional matrix. Thus, the user can see the classification results from several different viewpoints, simultaneously. Moreover, in the embodiment, keywords in the documents, including the keywords of the vertical line classification items with high occurrence frequencies are selected as horizontal classification items. A keyword, regardless of the vertical line keywords, will not be selected as a horizontally axial keyword. Furthermore, when classification items in the embodiment are selected, the keywords in the documents be classified, with high occurrence frequencies are selected. Thus, characteristics of the documents can be understood.

Next, a second embodiment of the present invention will now be described in detail with reference to Figs.

Figure 4:
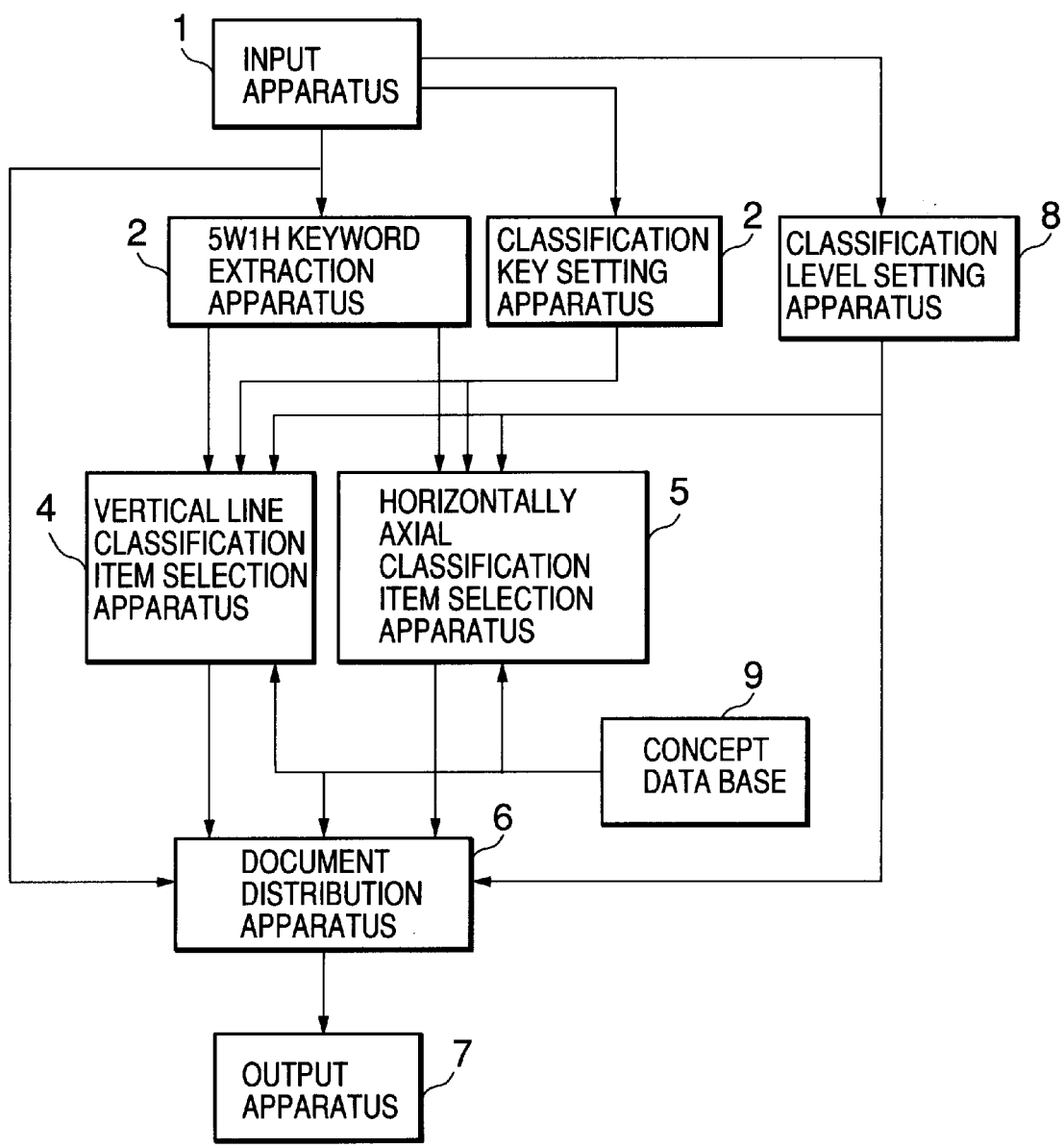
FIG. 4 shows the configuration of a second embodiment according to the present invention.

In reference to FIG. 4, the second embodiment of the present invention is comprised of the structure of the first embodiment, and a classification level setting apparatus 8 and a concept data base 9 as well.

The classification level setting apparatus 8 allows the user to select classification levels for words in the concept data base 9 for classification items on a vertical line and horizontal axis basis. When the user's selection is entered, the classification levels for the vertical line and the horizontal axis are sent to the vertical line classification item selection apparatus 4 and the horizontally axial classification item selection apparatus 5, respectively.

The concept data base 9 stores an upper notion category word to a variety of words which may become keywords. For example, when each of the "A corporation", "B corporation", and "C corporation" is an electrical manufacturer, the word "Electrical manufacturer" being a common notion of "A corporation", "B corporation", and "C corporation" will be stored in the concept data base 9. In addition, since Tokyo prefecture, Kanagawa prefecture, and Chiba prefecture are all located in the Kanto area, the word "Kanto area" will be stored in the concept data base 9 as a common upper notion of Tokyo prefecture, Kanagawa prefecture, and Chiba prefecture. In general, since a further upper notion category word recursively exists above an upper notion category word to a specific word, a hierarchic structure will be configured. Completely different levels are given to the respective layers in the structure. The concept data base 9 has the whole of the hierarchic structure, and has a form within which an upper notion category word in a designated level will be retrieved.

The operation of the second embodiment according to the present invention will now be described with reference to the Figs.

The operations of the 5W1H keyword extraction apparatus 2, the classification key setting apparatus 3, and the document distribution apparatus 6 in the second embodiment, shown by steps A1 to A4, and A8 in FIG. 5, are equivalent to those of apparatus 2, 3 and 6 in the embodiment shown in FIG. 1. Accordingly, their explanation will be omitted.

After steps A1 to A4, the classification level setting apparatus 8 reads in user-designated classification level data, based on the vertical line and the horizontal axis for classification, via the input apparatus 1 (step B1). Note that hereafter, the read-in vertical line classification level is referred to as LV; and the read-in horizontally axial classification level as LH.

In the second embodiment, the vertical line classification item selection apparatus 4 selects a word, which is either a keyword with a vertical line 5W1H attribute or its upper notion category word, as a vertical line classification item from the concept data base 9, in accordance with the vertical line classification level LV set by the classification level setting apparatus 8 in a step B1 (step B2). This process is performed through the retrieval of an upper notion category word in the level LV to each extracted keyword with the selected vertical line 5W1H attribute, from the concept data base 9. Then a selection of words with high occurrence frequencies from the retrieved words in turn, is performed. Note that when the vertical line 5W1H attribute is WHEN, a fixed period of time is used for a keyword representing a date and time, as its upper notion. For example, a one month period in April 1996 will be used as an upper notion to "Apr. 24th, 1996", while one year period in 1996 will be used as its further upper notion. Assignment of what particular period of time to what particular level of the hierarchy structure is predetermined. Note that the number of classification items selected in the step B2 can be predetermined, and alternatively, selection of the keywords (corresponding to words in level LV under the upper notion category, selected as the classification items) can be continued until the number of documents with vertical line 5W1H attribute exceeds a given rate to the number of all the documents. The process in step B2 is equivalent to that of the step A5 in the first embodiment where the upper notion category word in the level LV to a selected keyword will be utilized in place of the extracted keyword itself.

In the selection process of the step B2, words can be selected in the order of decreasing their occurrence frequencies in all documents as in the process of step A5 in the first embodiment. Alternatively, elimination of documents including a keyword with a vertical line 5W1H attribute (keyword corresponding to a word selected as the classification item, in level LV under the upper notion category) is made. Words with high occurrence frequencies will then be selected in the rest of the documents in turn.

The horizontally axial classification item selection apparatus 5 selects either a keyword itself with a horizontally axial 5W1H attribute or its upper notion category word for a horizontally axial classification item from the concept data base 9. This is done in accordance with the horizontally axial classification level LH, set by the classification level setting apparatus 8 in the step B1 (step B3). When a document including the selected keyword with the vertical line 5W1H attribute, (the keyword corresponding to a word selected as the vertical line classification item in the step B2, in level LV under the upper notion category) is referred to as "vertical line classification item corresponding document", this process is performed through the following steps. The first step: An upper notion category word in the level LH to each keyword with the selected horizontally axial 5W1H attribute (which has appeared in "vertical line classification item corresponding documents" and is also of the extracted keywords with 5W1H attributes) is retrieved from the concept data base 9. The second step: words with high occurrence frequencies are selected from the retrieved words in turn. Note that in the same manner as in the step B2, a fixed period of time is used as an upper notion for the keyword representing a date and time when horizontally axial 5W1H attribute is WHEN. Furthermore, the number of classification items selected in step B3 can be predetermined. Alternatively, the selection in the step B3 can be continued until the number of documents, including the keywords with a horizontally axial 5W1H attribute (the keywords corresponding to words selected as classification items, in level LH under the upper notion category) exceeds a given rate to the number of all the documents. The process in step B3 is equivalent to that of the step A6 in the first embodiment where an upper notion category word in the level LH to the extracted keyword is utilized in place of the keyword as the classification item to be selected.

In the classification item selection process in the step B3, words are selected in the same manner as in the step A6 of the first embodiment, in the order of their decreasing occurrence frequencies in the entire vertical line classification item corresponding documents in turn. Alternatively, it is also possible that documents including a keyword with a horizontally axial 5W1H attribute (keyword corresponding to a word selected as the classification item, in level LH under the upper notion category) will be eliminated, and then keywords with high occurrence frequencies will be selected in place in the remainder of documents in turn.

The document distribution apparatus 6 distributes a document including a keyword with the selected vertical line 5W1H attribute, (the keyword corresponding to a word selected in the step B2 as the vertical line classification item in level LV under the upper notion category) and a keyword with the selected horizontally axial 5W1H attribute (the keyword corresponding to a word selected as the horizontally axial classification item in the step B3, in level LH under the upper notion category) into a cell located on the intersection of both the row corresponding to the vertical line classification items and the column corresponding to the horizontally axial classification items in the 2-dimensional matrix (step B4). The document that includes a keyword with the selected vertical line 5W1H attribute (the keyword corresponding to a word selected as the vertical line classification item in the step B2, in level LV under the upper notion category) and further including no keyword with the selected horizontally axial 5W1H attribute (the keyword corresponding to a word selected as the horizontally axial classification item in the step B3, in level LH under the upper notion category) is distributed into a cell located on the intersection of both the row corresponding to the vertical line classification items and the default column in the 2-dimensional matrix. In addition, a document that includes no keyword with the selected vertical line 5W1H attribute (the keyword corresponding to a word selected as the vertical line classification item in the step B2, in level LV under the upper notion category) and further including a keyword with the selected horizontally axial 5W1H attribute (the keyword corresponding to a word selected as the horizontally axial classification item in the step B3, in level LV under the upper notion category) is distributed into a cell located on the intersection of both the default row and the column corresponding to the horizontally axial 5W1H attribute in the 2-dimensional matrix.

In the second embodiment, the vertical line classification level LV and the horizontally axial classification level LH are set by the user entering a designation through the classification level setting apparatus 8. Alternatively, they can also be automatically set by the vertical line classification item selection apparatus 4 and the horizontally axial classification item selection apparatus 5, respectively, to have a certain condition satisfied. As an example, the vertical line classification item selection apparatus 4 selects a fixed number of vertical line classification items. The LV can then be set so that the number of documents including keywords with the selected vertical line 5W1H attribute (keywords corresponding to words selected as vertical line classification items, in level LV under the upper notion category) exceeds a given rate to the number of the entire documents. In the same manner, the horizontally axial classification item selection apparatus 5 selects a fixed number of vertical line classification items. The LH can then be set so that the number of documents including a keyword with the selected horizontally axial 5W1H attribute (the keyword corresponding to a word selected as vertical line classification item, in level LH under the upper notion category) exceeds a given rate to the number of the entire documents.

Next, the embodiment of the present invention will now be described in detail.

We assume that the document classification apparatus according to the present invention classifies ten documents #1 to #10 shown in FIG. 10. In this case, the 5W1H keyword extraction apparatus 2 extracts keywords from each sentence through a morphological analysis of the sentence in each document, and then assigns a 5W1H attribute to each keyword (steps A1 to A3). When we assume that a 5W1H attribute is assigned to each keyword in conformity with the same rule as that of the example operation of the first embodiment according to the present invention. Keywords with 5W1H attributes for each document are shown in FIG. 11. Note that in this example, no keywords with the WHEN attribute or the WHY attribute are extracted; accordingly, they are omitted in FIG. 11.

The classification key setting apparatus 3 reads in 5W1H attributes for use in both the vertical line classification and the horizontally axial classification, respectively. We assume here that WHERE is designated as a vertical line 5W1H attribute, and WHO as a horizontally axial 5W1H attribute.

Figure 12:
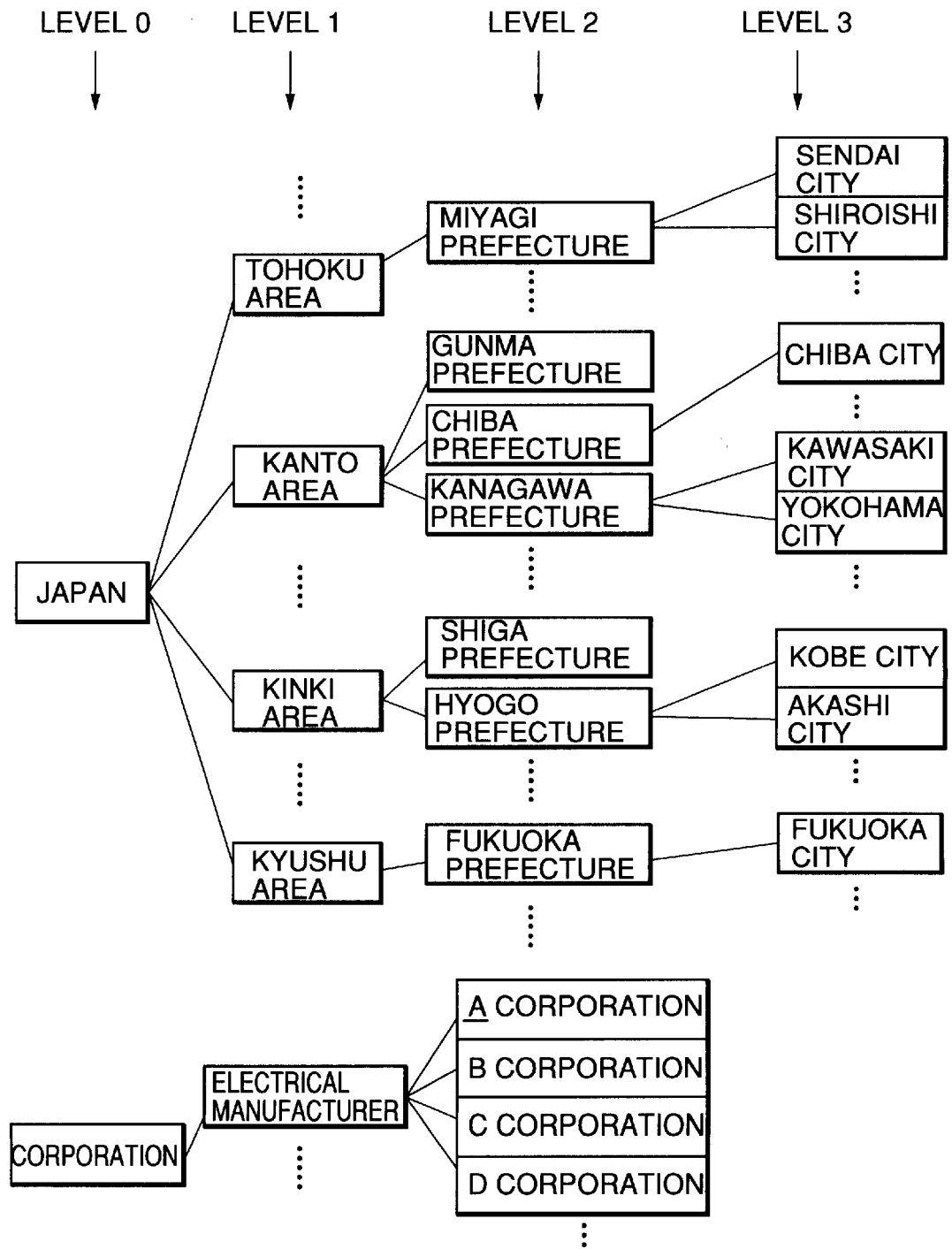
FIG. 12 shows the content of a concept data base 9 in the second embodiment according to the present invention.

Referring to FIG. 12, for example, the concept data base 9 includes a hierarchical relation between keywords for location names and another hierarchical relation between keywords for organization names. Absolute levels in terms of the respective relations in the hierarchy are held different.

The classification level setting apparatus 8 reads in a vertical line classification level LV and horizontally axial classification level LH designated by the user, respectively (step B1). We assume here that 1 is designated for LV, and 2 for LH.

The vertical line classification item selection apparatus 4 retrieves an upper notion category word in level 1 in the concept data base to the keyword with the WHERE attribute of the extracted keyword with 5W1H attribute. It then selects words with high occurrence frequencies from the retrieved words in turn (step B2). We assume here that three classification items are selected in the order of their decreasing occurrence frequencies in the entire documents. The keywords with the WHERE attribute in the documents shown in FIG. 12 correspond to the respective upper notion category words in the level 1, which are shown in FIG. 13. Referring to FIG. 13, the occurrence frequencies of the upper notion category words in the level 1 are five for "Kanto area", four for "Kinki area", two for "Tohoku area", and one for "Kyusyu area"; thus, the three words "Kanto area", "Kinki area", and "Tohoku area" are selected as vertical line classification items in this written order.

Referring to FIG. 13, the documents including a keyword with the WHERE attribute (keyword corresponding to one of the "Kanto area", "Kinki area", and "Tohoku area" in level 1 under the upper notion category) are nine documents except for #5. The horizontally axial classification item selection apparatus 5 retrieves an upper notion category word in the level 2 in the concept data base 9 to each of the keywords with the WHO attribute which have appeared in the previously mentioned nine documents and is also of the extracted keywords with 5W1H attributes. Then words with high occurrence frequencies from the retrieved words in turn, are selected (step B3). We assume here that three classification items are selected in the order of their decreasing occurrence frequencies in the previously mentioned nine documents. Referring to FIG. 12, each of the keywords with the WHO attribute in each document is a word in the level 2 in the hierarchy in the concept data base 9. Referring to FIG. 11, the occurrence frequencies of the keywords with the WHO attribute in the previously mentioned nine documents are five for "A-SHA" (="A corporation"), three for "B-SHA" (="B corporation"), two for "C-SHA" (="C corporation"), and one for "D-SHA" (="D corporation"); thus, three keywords "A-SHA" (="A corporation"), "B-SHA" (="B corporation"), and "C-SHA" (="C corporation") are selected as horizontally axial classification items in this written order.

The document distribution apparatus 6 distributes a document including a keyword with the WHERE attribute (the keyword corresponding to a word selected as a vertical line classification item, in level 2 under the upper notion category) and a keyword with the WHO attribute (the keyword corresponding to a word selected as a horizontally axial classification item, in level 2 under the upper notion category), into a cell located on the intersection of both the row corresponding to the vertical line classification item and the column corresponding to the horizontally axial classification item in the 2-dimensional matrix (step B4). A document including no keyword with the WHERE attribute (keyword corresponding to a word selected as a vertical line classification item, in level 1 under the upper notion category) is distributed into a cell in the default row, while another keyword with the WHO attribute (the keyword corresponding to a word selected as a horizontally axial classification item, in level 2 under the upper notion category) is distributed into a cell in the default column. For example, the document #1 includes "SHIROISHI-SHI" (="Shiroishi city") as a keyword with the WHERE attribute, and "A-SHA" (="A corporation") as a keyword with the WHO attribute. Referring to FIG. 12, an upper notion category word in the level 1 to "SHIROISHI CITY" is "TOHOKU AREA", an upper notion category word in the level 2 to "A corporation" is "A corporation". Thus, the document #1 is distributed into a cell located on the intersection of both the row corresponding to "TOHOKU AREA" and the column corresponding to "A corporation". Furthermore, document #5 includes "FUKUOKA-SHI" (="Fukuoka city") as a keyword with the WHERE attribute, and "B-SHA" (="B corporation") as a keyword with the WHO attribute. Referring to FIG. 12, an upper notion category word in the level 1 to "Fukuoka city" is the "Kyusyu area", and an upper notion category word in the level 2 to "B corporation" is "B corporation". Classification item "B corporation" exists in the horizontal axis, however, no classification item "Kyusyu area" exists in the vertical line. Thus, the document #5 is distributed into a cell located on the intersection of both the default row and the column corresponding to "B corporation".

When all the documents have been distributed, the document distribution apparatus 6 outputs its results in table form (step A8). When the output is performed with the form where respective document numbers are stored into each cell in the 2-dimensional matrix, the output results will be shown in FIG. 14.

Next, the advantages of the second embodiment of the present invention will be described.

In the second embodiment of the present invention, the vertical line classification item selection apparatus 4 and the horizontally axial classification item selection apparatus 5 select no extracted keyword through referring to the concept data base 9, however, its upper notion category word in a designated level as a classification item is selected. Therefore, Words as classification keys can be prepared for the level of the user's intention. These are effectively used to designate WHEN or WHERE as 5W1H attributes particularly for use in classification. Classification based on the axis of WHEN, documents are classified into each fixed period of time. In addition, for classification based upon the axis of WHERE, documents are classified into each fixed area.

A third embodiment of the present invention will now be described with reference to Figs.

Figure 15:
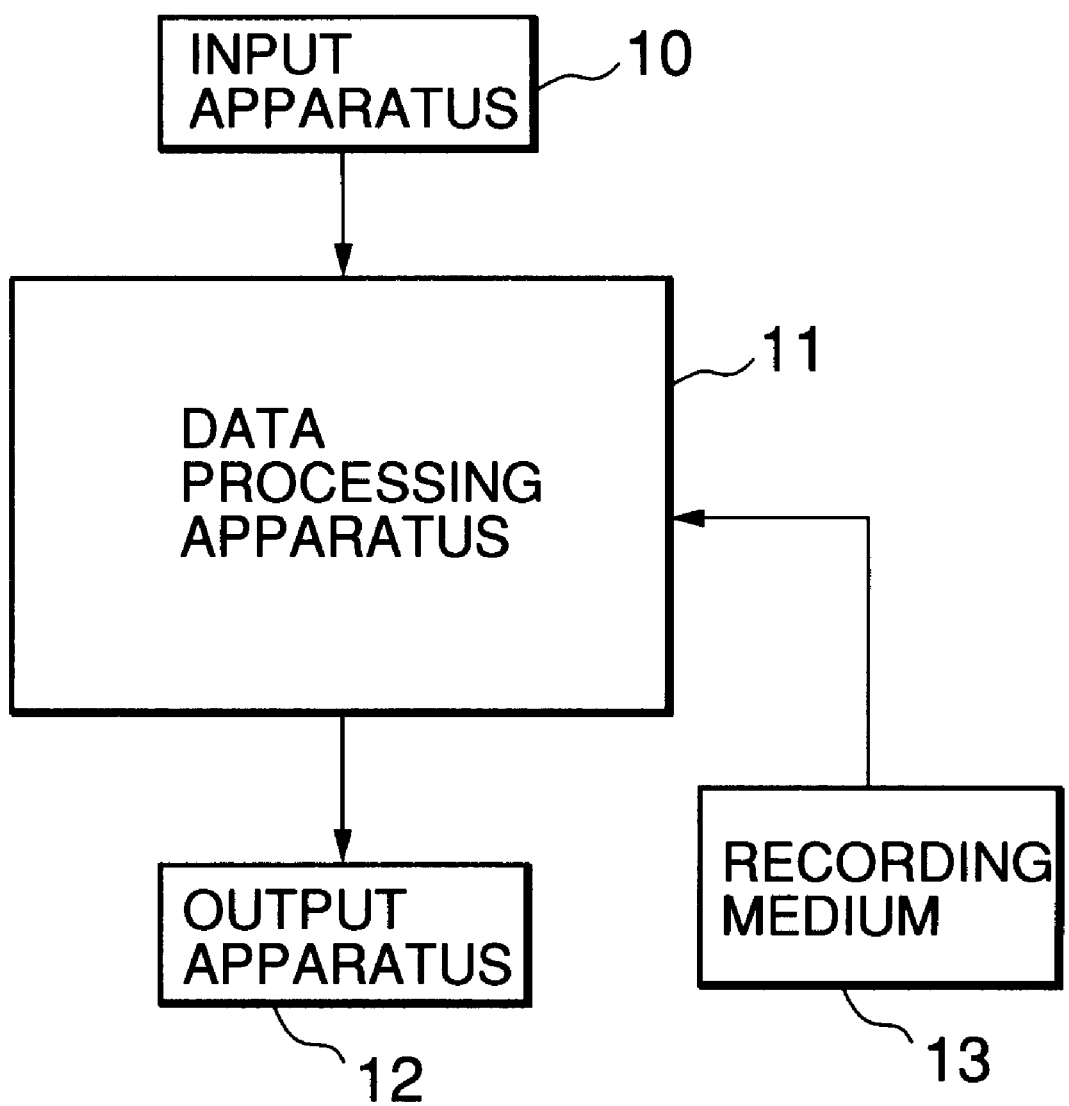
FIG. 15 shows the configuration of a third embodiment of the present invention.

Referring to FIG. 15, the third embodiment of the present invention comprises a recording medium 13 which a document classification program is recorded. The recording medium 13 can be a magnetic disk or a semiconductor memory or other related recording media.

The document classification program is read into a data processing apparatus 11 from the recording medium 13, following with the controlled operation of the data processing apparatus 11. The data processing apparatus 11 performs the following processes through the control via the document classification program.

When documents are given from the input apparatus 10, the data processing apparatus 11 extracts keywords with 5W1H attributes from the documents; reads in 5W1H attributes for classification as classification keys entered by the user; selects keywords with the 5W1H attributes as classification items; distributes the documents including the classification items to corresponding cells to respective classification items; and then outputs them to the output apparatus such as a display apparatus or a printer. The output apparatus 12 then displays the distributed results to the user.

As a first result according to the present invention, documents are classified from the viewpoint of the meaningful 5W1H. With WHO as an axis, classification will be performed for each subject in terms of the events described in the documents; with WHEN as an axis for each time; with WHERE as an axis for each area; with WHAT as an axis for each object; with WHY as an axis for each different reason; and with HOW as an axis for each action.

This process has resulted from the 5W1H keyword extraction apparatus 2 which assigns a 5W1H attribute to a keyword when extracting keywords from the documents. It then selects keywords with the designated 5W1H attributes, and then classifies the documents with them as keys.

As a second result, a user can analyze the classification results from several viewpoints. Thus, document distributions between horizontally axial keywords for a different vertical line keyword can be easily compared, causing for easier comparison of the related documents. Note that the horizontally axial keywords relevant to the vertical line keywords are selected; thus, no combination of them from several regardless viewpoints will be made.

This can be attributed to the fact that the vertical line classification item selection apparatus 4 and the horizontally axial classification item selection apparatus 5 select vertical line classification and horizontally axial classification items in accordance with the user-designated vertical line 5W1H attribute and horizontally axial 5W1H attribute. The document distribution apparatus 6 then classifies documents with the items as keys into a 2-dimensional matrix. Particularly, when the horizontally axial classification item selection apparatus 5 selects vertical line classification items, the range of documents to be selected is limited to only the documents classified into vertical line classification items, and documents relevant to the vertical line classification items will be selected as horizontally axial classification items.

A third result is that the keywords frequently used in a group of the documents to be classified, are selected as classification items. Thus, the kind of documents that frequently appear can be easily understood.

This can be attributed to the fact that the vertical line classification item selection apparatus 4 and the horizontally axial classification item selection apparatus 5 select classification items in the order of their decreasing occurrence frequencies in objective documents, respectively.

A fourth result is that a fixed level of words can be prepared for classification items. This allows for the region which the words of the classification items refer to to be limited, enabling a simple comparison of the rows and of the columns in the matrix of the classification results.

This emanates from the fact that in the second embodiment of the present invention, the vertical line classification item selection apparatus 4, and the horizontally axial classification item selection apparatus 5, select no keywords extracted from documents but select their upper notion category words in a designated level.

What is claimed is:

1. A document classification apparatus comprising:
    a 5W1H keyword extraction means for extracting keywords, each of which has a 5W1H attribute, from a document entered through an input apparatus;
    a classification key setting means for setting a 5W1H attribute entered through the input apparatus as a classification key;
    a classification item selection means for selecting keywords as classification items, each of which has the 5W1H attribute set by the classification key setting means as a classification key, out of keywords extracted by the 5W1H keyword extraction means; and
    a document distribution means for distributing a document including one of the keywords which are selected as classification items by the classification item selection means and have the 5W1H attribute set as classification keys by the classification key setting means, into a cell corresponding to one of the classification items.

2. The document classification apparatus as claimed in claim 1, wherein: the classification item selection means selects keywords by the order of their decreasing occurrence frequencies in the document.

3. The document classification apparatus as claimed in claim 1, wherein: the classification item selection means selects keywords as classification items in the order of their decreasing occurrence frequencies in a document including no keywords selected as classification items.

4. A document classification apparatus comprising:
    a 5W1H keyword extraction means for extracting keywords with 5W1H attributes from a document entered through an input apparatus;
    a classification key setting means for setting two 5W1H attributes entered through the input apparatus as a vertical line classification key and a horizontally axial classification key, respectively;
    a vertical line classification item selection means for selecting keywords with 5W1H attributes as vertical line classification items, extracted by the 5W1H keyword extraction means and then set by the classification key setting means as vertical line classification keys;
    a horizontally axial classification item selection means for selecting keywords with 5W1H attributes as horizontally axial classification items, extracted by the 5W1H keyword extraction means and then set by the classification key setting means as horizontally axial keys; and
    a document distribution means for distributing a document that includes the keyword selected as vertical line classification item by the vertical line classification item selection means with the 5W1H attribute set as the vertical line classification key by the classification key setting means and further includes the keyword selected as horizontally axial classification item by the horizontally axial classification item selection means with the 5W1H attribute set as the horizontally axial classification key by the classification key setting means, into a cell located on the intersection of both the row corresponding to the vertical line classification items and the column corresponding to the horizontally axial classification items in a 2-dimensional matrix.

5. The document classification apparatus as claimed in claim 4, wherein: the vertical line classification item selection means selects keywords as vertical line classification items in the order of their decreasing occurrence frequencies in the document, and the horizontally axial classification item selection means selects keywords as horizontally axial classification items in the order of their decreasing occurrence frequencies in the document.

6. The document classification apparatus as claimed in claim 4, wherein: the vertical line classification item selection means selects keywords as vertical line classification items in the order of their deceasing occurrence frequencies in a document including no keyword selected as the vertical line classification item, and the horizontally axial classification item selection means selects keywords as horizontally axial classification items in the order of their decreasing occurrence frequencies in a document including no keyword selected as horizontally axial classification item.

7. The document classification apparatus as claimed in claim 4, wherein: the horizontally axial classification item selection means selects keywords as horizontally axial classification items in a document including the keyword selected as the vertical line classification item by the vertical line classification item selection means with the 5W1H attribute set as the vertical line classification item by the classification key setting means.

8. The document classification apparatus as claimed in claim 7, wherein: the vertical line classification item selection means selects keywords as vertical line classification items in the order of their occurrence frequencies; and the horizontally axial classification item selection means selects keywords as horizontally axial classification items in the order of their occurrence frequencies.

9. The document classification apparatus as claimed in claim 7, wherein: the vertical line classification item selection means selects keywords as vertical line classification items in the order of their decreasing occurrence frequencies in a document including no keyword selected as the vertical line classification item; and the horizontally axial classification item selection means selects keywords as horizontally axial classification items in the order of their decreasing occurrence frequencies in a document including no keyword selected as the horizontally axial classification item.

10. A document classification apparatus comprising:
- a 5W1H keyword extraction means for extracting keywords, each of which has a 5W1H attribute, from a document entered through an input apparatus;
- a classification key setting means for setting a 5W1H attribute entered through the input apparatus as a classification key;
- a classification level setting means for setting a level entered through the input apparatus as a classification level;
- a concept data base means for classifying words which may appear in a document as keywords into hierarchic layers in accordance with an upper or lower notion level to each word, assigning a different level to each hierarchic layer, and storing them;
- a classification item selection means for selecting broader concept words of the keywords extracted by the 5W1H keyword extraction means as classification items, each of which has the 5W1H attribute set by the classification key setting means as a classification key, from words in the classification level set by the classification level setting means in the concept data base means; and
- a document distribution means for distributing a document including one of the keywords, whose broader concepts contain one of the words selected as classification items by the classification item selection means in the level set by the classification level setting means in the concept data base means and which has the 5W1H attribute set as the classification key by the classification key setting means, into a cell corresponding to one of the classification items.

11. The document classification apparatus as claimed in claim 10, wherein: the classification item selection means selects words as classification items in the order of decreasing occurrence frequencies of keywords in the document; the keywords corresponding to words in the classification level set by the classification level setting means under the upper notion category in terms of the concept data base means.

12. The document classification apparatus as claimed in claim 10, wherein: the classification item selection means selects words as classification items in the order of their decreasing occurrence frequencies in a document in which a first keyword corresponds to a word in the classification level set by the classification level setting means, under the upper notion category words in terms of the concept data base means, does not include a second keyword which corresponds to a word selected as the classification item in the classification level set by the classification level setting means, under the upper notion category.

13. A document classification apparatus comprising:
- a 5W1H keyword extraction means for extracting keywords with 5W1H attributes from a document entered through an input apparatus;
- a classification key setting means for setting two 5W1H attributes entered through the input apparatus as a vertical line classification key and a horizontally axial classification key, respectively;
- a classification level setting means for setting two levels entered through the input apparatus as a vertical line classification level and a horizontally axial classification level, respectively;
- a concept data base means for classifying words which may appear as keywords in a document into hierarchic layers in accordance with the upper or lower notion level to each word, assigning a different level to each hierarchic layer, and storing them;
- a vertical line classification item selection means for selecting as vertical line classification item a broader concept of the keyword extracted by the 5W1H keyword extraction means and being with the 5W1H attributes set as vertical line classification keys by the classification key setting means, from words in a vertical line classification level set by the classification level setting means in the concept data base means;
- a horizontally axial classification item selection means for selecting as horizontally axial classification item a broader concept of the keyword extracted by the 5W1H keyword extraction means and being with the 5W1H attributes set as horizontally axial classification keys by the classification key setting means, from words in a horizontally axial classification level set by the classification level setting means in the concept data base means; and
- a document distribution means for distributing a document including a first keyword word with the 5W1H attribute set as the vertical line classification key by the classification key setting means and a second keyword with the 5W1H attribute set as the horizontally axial classification key by the classification key setting means, into a cell located on the intersection of both the row corresponding to the vertical line classification items and the column corresponding to the horizontally axial classification items in a 2-dimensional matrix; broader concepts of the first keyword containing the word selected as the vertical line classification item by the vertical line classification item selection means in the vertical line level set by the classification level setting means in the concept data base means, and broader concepts of the second keyword containing the word selected as the horizontally axial classification item by the horizontally axial classification item selection means in the horizontally axial level set by the classification level setting means in the concept data base means.

14. The document classification apparatus as claimed in claim 13, wherein: the vertical line classification item selection means selects words as vertical line classification items in the order of decreasing occurrence frequencies of keywords in the document; the keywords corresponding to the words in the vertical line classification level set by the classification level setting means, under the upper notion category in terms of the concept data base means, while the horizontally axial classification item selection means selects words as horizontally axial classification items in the order of decreasing occurrence frequencies of keywords in the document; the keywords corresponding to the words in the horizontally axial classification level set by the classification level setting means, under the upper notion category in terms of the concept data base means.

15. The document classification apparatus as claimed in claim 13, wherein: the vertical line classification item selection means selects the words as vertical line classification items in the order of their decreasing occurrence frequencies in a document in which a first keyword corresponding to the word in the vertical line classification level set by the classification level setting means, under the upper notion category in terms of the concept data base means, does not include a second keyword which corresponds to a word selected as the vertical line classification item in the vertical line classification level set by the classification level setting means, under the upper notion category in terms of the concept data base means; and the horizontally axial classification item selection means selects words as horizontally axial classification items in the order of their decreasing occurrence frequencies in a document in which a third keyword corresponding to a word selected as the horizontally axial classification item in the horizontally axial classification level set by the classification level setting means, under the upper notion category in terms of the concept data base means, does not include a fourth keyword which corresponds to a word selected as the horizontally axial classification item in the horizontally axial classification level set by the classification level setting means, under the upper notion category in terms of the concept data base means.

16. The document classification apparatus as claimed in claim 13, wherein: the horizontally axial classification item selection means selects the words as horizontally axial classification items from upper notion category words to keywords in a document including a keyword with the 5W1H attribute set as vertical line classification key by the classification key setting means; the keyword corresponding to a word selected by the vertical line classification item selection means in the vertical line classification level set by the classification level setting means, under the upper notion category in terms of the concept data base.

17. The document classification apparatus as claimed in claim 16, wherein: the vertical line classification item selection means selects words as vertical line classification items in the order of decreasing occurrence frequencies of keywords in the document; the keywords corresponding to the words in the vertical line classification level set by the classification level setting means, under the upper notion category in terms of the concept data base means, and the horizontally axial classification item selection means selects words as horizontally axial classification items in the order of decreasing occurrence frequencies of keywords in the document; the keywords corresponding to the words in the horizontally axial classification level set by the classification level setting means, under the upper notion category in terms of the concept data base means.

18. The document classification apparatus as claimed in claim 16, wherein: the vertical line classification item selection means selects the words as vertical line classification items in the order of their decreasing occurrence frequencies in a document in which a first keyword corresponds to the word in the vertical line classification level set by the classification level setting means, under the upper notion category in terms of the concept data base means, does not include a second keyword which corresponds to the word selected as the vertical line classification item in the vertical line classification level set by the classification level setting means, under the upper notion category in terms of the concept data base means; and the horizontally axial classification item selection means selects the words as horizontally axial classification items in the order of their decreasing occurrence frequencies in a document in which a third keyword corresponding to the word in the horizontally axial classification level set by the classification level setting means, under the upper notion category in terms of the concept data base means, does not include a fourth keyword which corresponds to a word selected as horizontally axial classification items in the horizontally axial classification level set by the classification level setting means, under the upper notion category in terms of the concept data base means.

19. A document classification method comprising the steps of:

extracting keywords, each of which has a 5W1H attribute, from a document entered through an input apparatus;

setting a 5W1H attribute entered through the input apparatus as a classification key;

selecting keywords as classification items, each of which has the 5W1H attribute set in the setting step as a classification key, out of keywords extracted in the extracting keyword step; and distributing a document including one of the keywords which are selected as the classification items and have the 5W1H attribute set as the classification key, into a cell corresponding to one of the classification items.

20. A document classification method comprising the steps of:

extracting keywords, each of which has a 5W1H attribute, from a document entered through an input apparatus;

setting a 5W1H attribute entered through the input apparatus as a classification key;

setting a level entered through the input apparatus as a classification level;

classifying words which may appear as keywords in a document, into the upper or lower notion hierarchic layer to the words, assigning a specific level to each hierarchic layer, and storing them as a concept data base;

selecting upper notion category words as classification items, each of which has the 5W1H attribute set in the setting a 5W1H attribute step as a classification key, out of the keywords extracted from words in the classification level; and distributing a document including one of the keywords with the 5W1H attribute set as the classification key into a cell corresponding to one of the classification items; the one of the keywords corresponding to a word selected as the classification item in the level under the upper notion category in the concept data base.

21. A computer-readable medium, comprising:

a computer-readable data storage device;

a program stored on said device, said program causing a computer:

to extract keywords, each of which has a 5W1H attribute, from a document entered through an input apparatus;

to set a 5W1H attribute entered through the input apparatus as a classification key;

to select keywords as classification items, each of which has the 5W1H attribute set in the to set step as a classification key, out of keywords extracted in the to extract keywords step; and to distribute a document including one of the keywords which are selected as the classification items and have the 5W1H attribute set as the classification key into a cell corresponding to one of the classification items.

22. A computer-readable medium, comprising:

a computer-readable data storage device;

a program stored on said device, said program causing a computer:

to extract keywords, each of which has a 5W1H attribute, from a document entered through an input apparatus;

to set a 5W1H attribute entered through the input apparatus as a classification key;

to set a level entered through the input apparatus as a classification level;

to classify words, which may appear in a document as a keyword, into hierarchic notion layers in accordance with the upper or lower notion to each word, to assign a different level to each hierarchic notion layer, and to store them as a concept data base;

to select broader concept words as classification items to the extracted keywords, each classification item has the 5W1H attribute set in the to set a 5W1H attribute step as a classification key, from words in the classification level in terms of the concept data base; and to distribute a document including one of the keywords with the 5W1H attribute set as the classification key, into a cell corresponding to one of the classification items; the one of the keywords corresponding to a word selected as the classification item in the level under the broader concept in terms of the concept data base.

* * * * *